US011157119B2

(12) United States Patent
Lee et al.

(10) Patent No.: US 11,157,119 B2
(45) Date of Patent: Oct. 26, 2021

(54) TOUCH SENSOR AND METHOD OF MANUFACTURING THE SAME

(71) Applicant: DONGWOO FINE-CHEM CO., LTD., Iksan-si (KR)

(72) Inventors: Cheol Hun Lee, Pyeongtaek-si (KR); Dohyoung Kwon, Osan-si (KR); Ji-Yeon Kim, Pyeongtaek-si (KR); Ki Deok Lee, Osan-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 17/082,185

(22) Filed: Oct. 28, 2020

(65) Prior Publication Data

US 2021/0132737 A1 May 6, 2021

(30) Foreign Application Priority Data

Nov. 1, 2019 (KR) ........................ 10-2019-0138464

(51) Int. Cl.
*G06F 3/044* (2006.01)

(52) U.S. Cl.
CPC .. *G06F 3/0443* (2019.05); *G06F 2203/04103* (2013.01); *G06F 2203/04111* (2013.01)

(58) Field of Classification Search
None
See application file for complete search history.

(56) References Cited

U.S. PATENT DOCUMENTS 9,569,031 B2 * 2/2017 Han ...................... G06F 3/0416
2013/0266724 A1 * 10/2013 Cheong ................. G06F 3/0443
427/97.2

FOREIGN PATENT DOCUMENTS

KR 10-1217591 B1 1/2013

* cited by examiner

*Primary Examiner* — Duane N Taylor, Jr.
(74) *Attorney, Agent, or Firm* — Sughrue Mion, PLLC

(57) ABSTRACT

A touch sensor includes a base layer; an electrode layer including, on the base layer, first array sensing cells connected and arranged in a first direction and second array sensing cells spaced apart from the first array sensing cells and arranged spaced apart in a second direction, the first and second sensing cells being provided with dummy holes; an insulation layer formed on the electrode layer and being provided with contact holes connecting the neighboring second array sensing cells in the second direction; and bridges formed on the contact hole and the insulation layer to electrically connect the neighboring second array sensing cells.

17 Claims, 7 Drawing Sheets

[Figure 1]
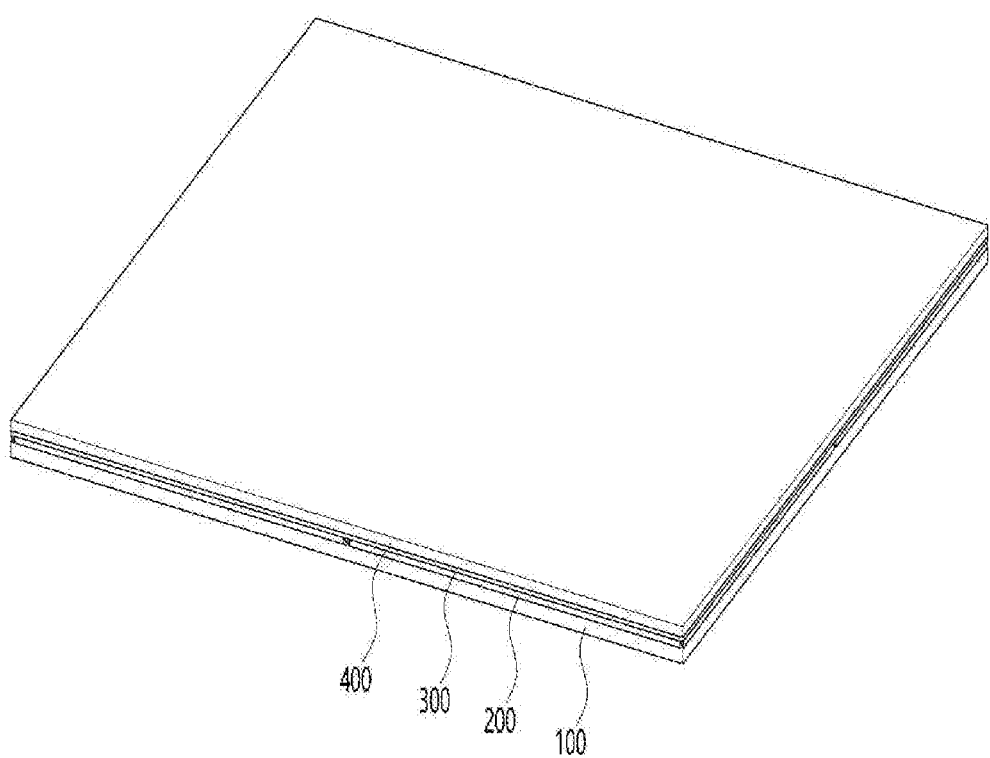

【Figure 2】
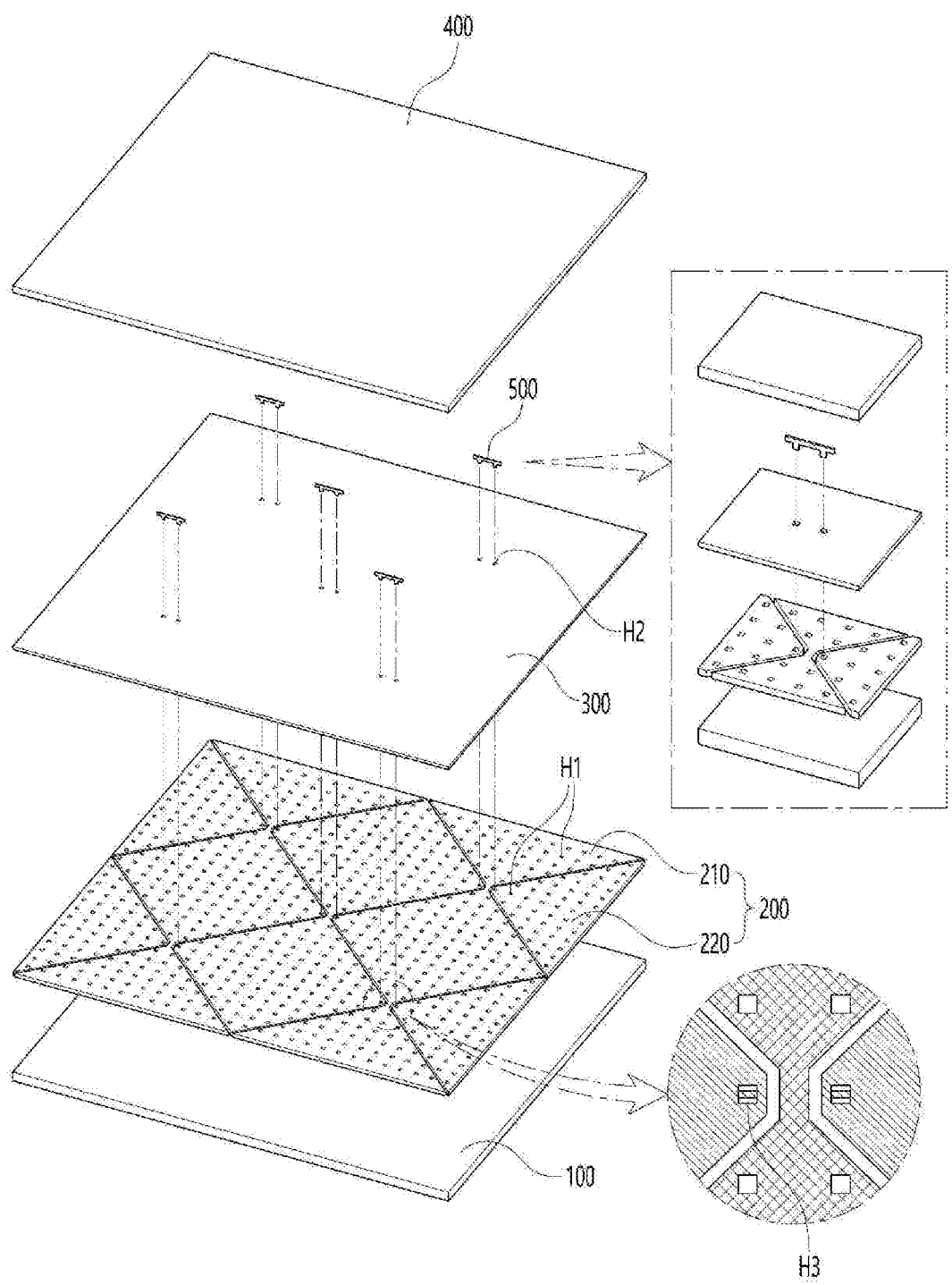

【Figure 3】
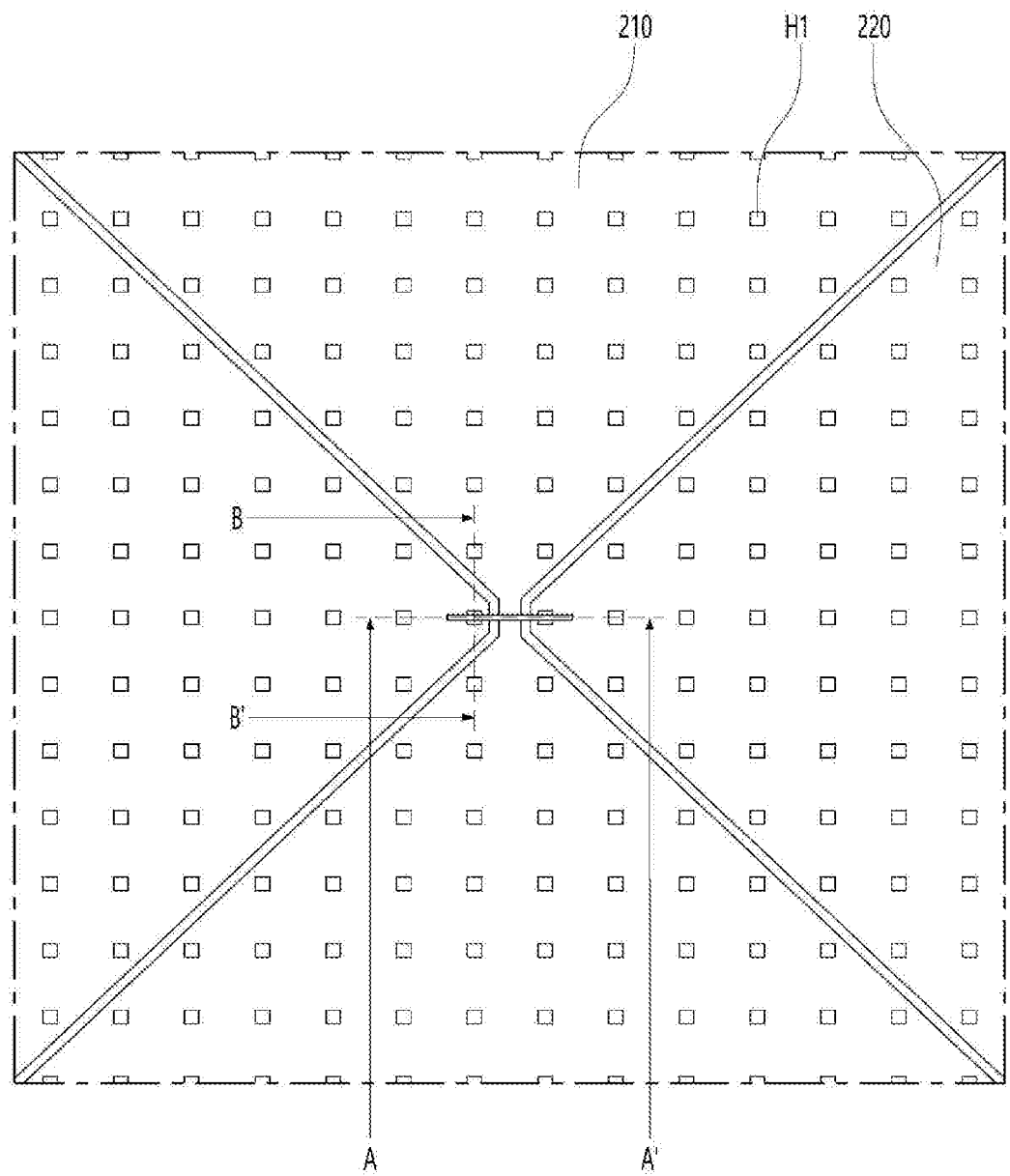

【Figure 4A】
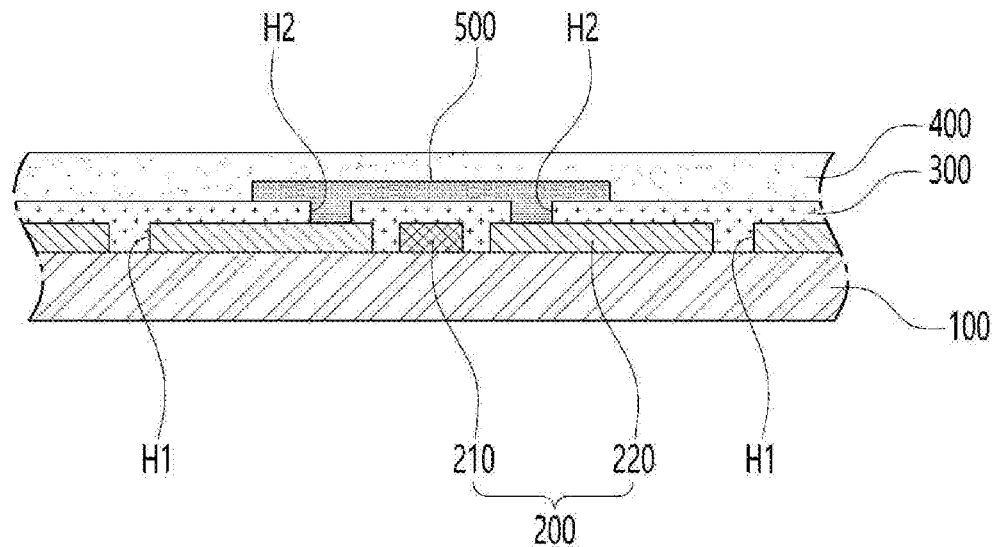
【Figure 4B】
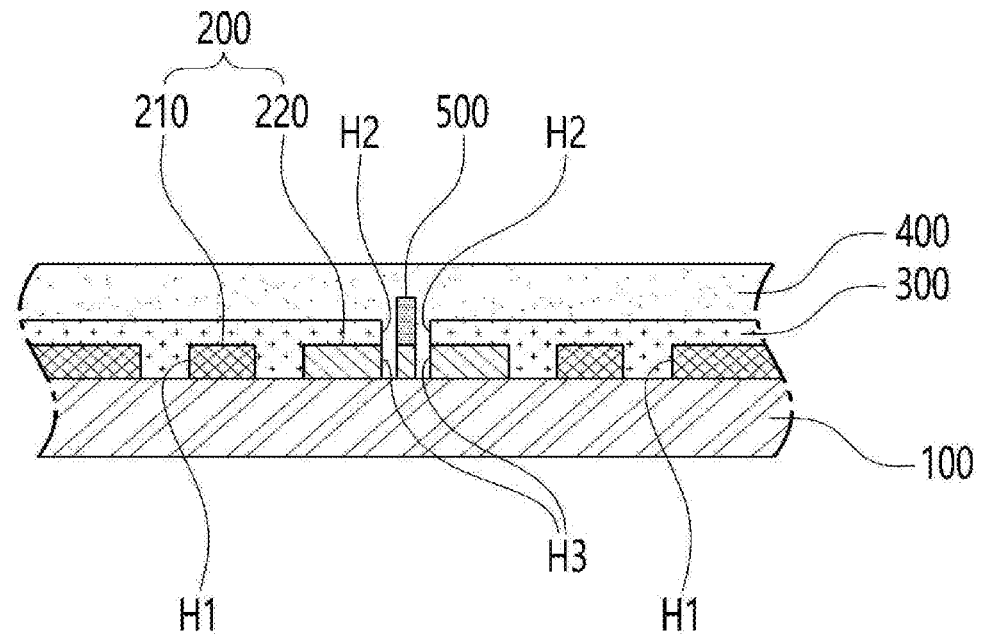

[Figure 5A]
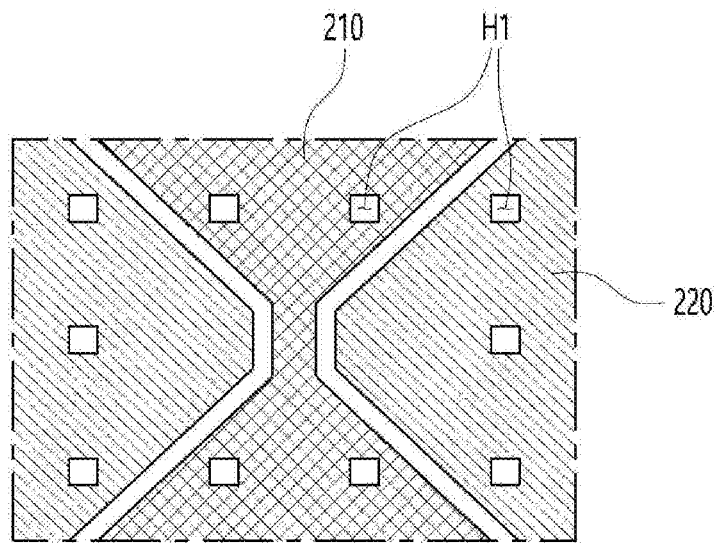
[Figure 5B]
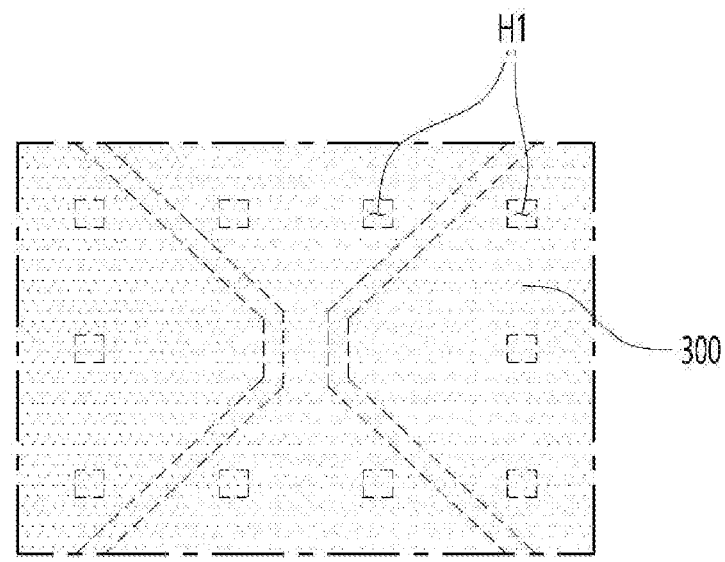

[Figure 5C]
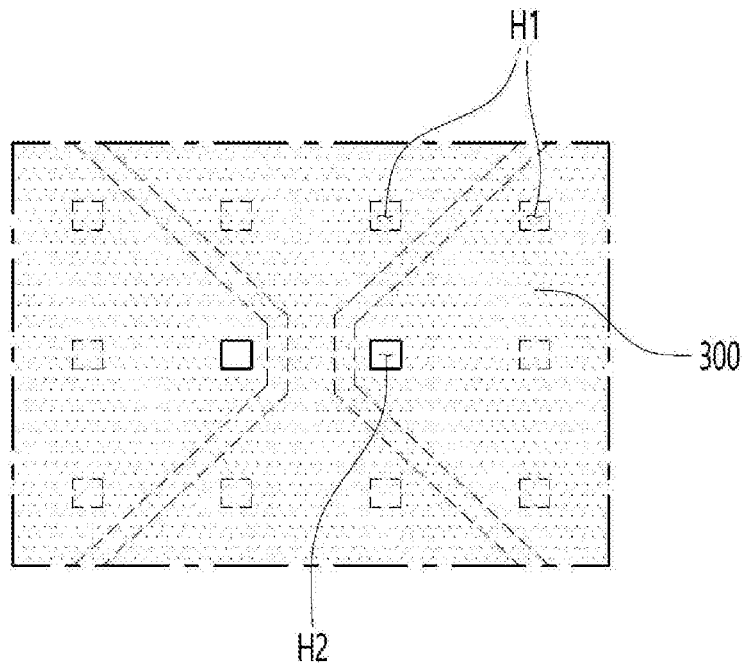
[Figure 5D]
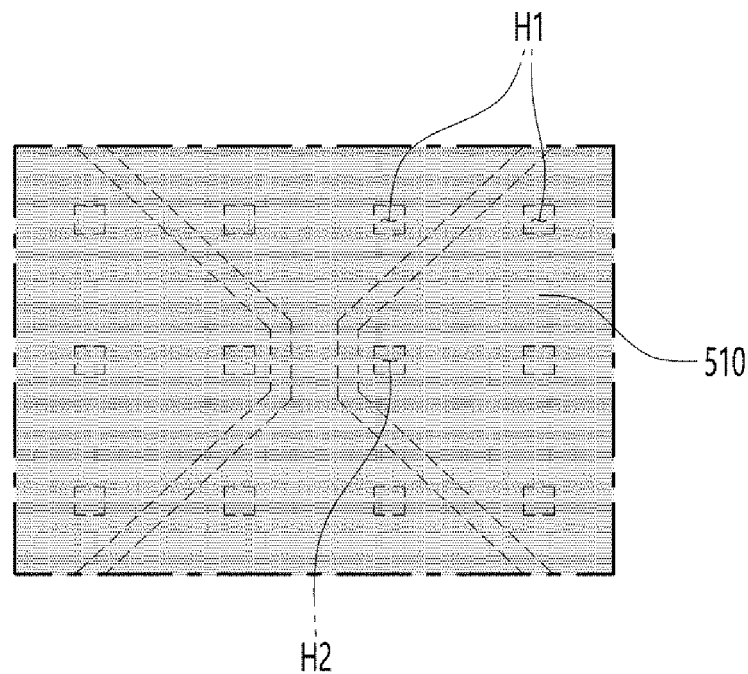

[Figure 5E]
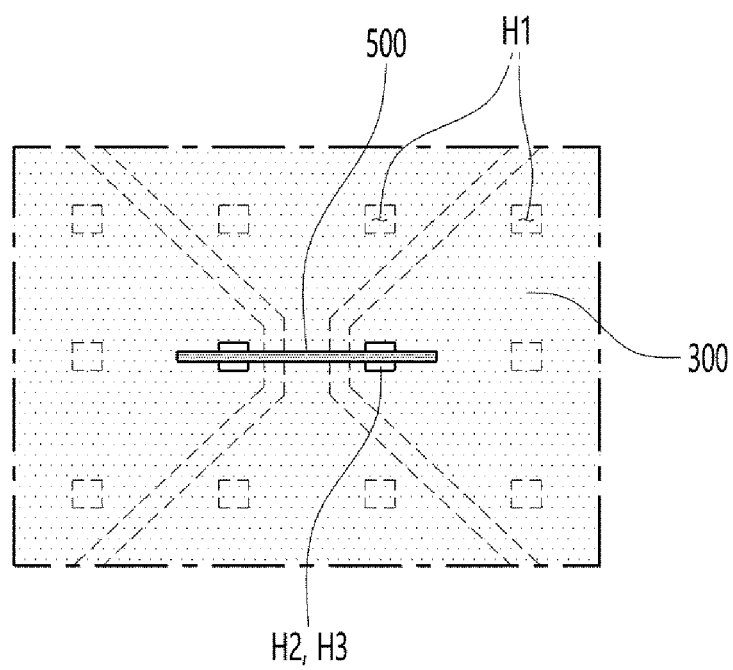

TOUCH SENSOR AND METHOD OF MANUFACTURING THE SAME

CROSS REFERENCE TO RELATED APPLICATIONS

This application claims priority based on Korean Patent Application No. 10-2019-0138464, filed Nov. 1, 2019, the content of which is incorporated herein by reference in its entirety.

TECHNICAL FIELD

The present invention relates to a touch sensor. Specifically, in an upper connection method (Top Bridge) in which a bridge is formed on an upper side, the bridge area can be visually recognized due to a selective etching in a bridge formation process, and the present invention relates to a touch sensor capable of preventing this problem and a manufacturing method thereof.

BACKGROUND ART

A touch sensor of a smartphone or the like is an input device that receives a command by a touch. The touch sensor includes a resistive type, a capacitive type, an ultrasonic type, an infrared type, and so on, according to the sensing method of a touch part. Recently, the capacitive type is mainly used for the touch sensor.

The capacitive type uses a transparent substrate on which a conductive thin film is formed. When a user touches a surface of a coated transparent substrate with a certain amount of current flowing through the surface of the transparent substrate, the amount of current changes at the contact surface. The capacitive type detects such a change in current to detect whether or not it is touched.

A touch sensor includes a plurality of sensing cells arranged in X and Y axes on a transparent substrate. The first and second array sensing cells arranged respectively in the X and Y axis directions may be respectively connected to the first and second wiring portions at the edge of the transparent substrate. The first and second wiring portions may extend along the side edges of the transparent substrate to be connected to an electrode pad portion at the lower edge of the transparent substrate. The electrode pad portion may be connected to a printed circuit board (FPCB, etc.) through an anisotropic conductive film (ACF) or the like. Through this, the electrode pad portion may transmit a touch signal of the sensing cell to a control unit (IC chip, etc.).

The touch sensor electrically connects the second array sensing cells that are spaced apart using a bridge. There are two types of bridges: a bottom bridge which connects the sensing cells on a lower side thereof and a top bridge.

However, as in Korean Patent Registration No. 1217591 titled "Capacitive Touch Sensor", when a bridge is formed in an upper connection method, a conductive metal layer, which is a material constituting the bridge, may be selectively etched. In this case, a transparent conductive layer (metal oxide, etc.) constituting the sensing cell may be etched together. As a result, there may be a problem that the bridge area is visually recognized.

DISCLOSURE OF INVENTION

Technical Problem

The present invention is to solve such a problem of the prior art, and an object of the present invention is to provide a touch sensor capable of solving the problem of visual recognition of a bridge area when the bridge is formed in an upper connection method and a method of manufacturing the same.

Technical Solution

A touch sensor of the present invention for achieving this object may comprise a base layer, an electrode layer, an insulation layer, a plurality of bridges, and so on.

The base layer may support the electrode layer and the like combined thereon.

The electrode layer may include first array sensing cells connected and arranged in a first direction and second array sensing cells spaced apart from the first array sensing cells and arranged spaced apart in a second direction on the base layer. The first and second sensing cells may be provided with dummy holes.

The insulation layer may be formed on the electrode layer. The insulation layer may be provided with contact holes connecting the neighboring second array sensing cells in the second direction.

The bridges may be formed on the contact hole and the insulation layer to electrically connect the neighboring second array sensing cells.

In the touch sensor of the present invention, the bridge may have a width narrower than that of the contact hole.

In the touch sensor of the present invention, the second array sensing cell may be provided with an etching hole formed by removing an area excluding the bridge area in the contact hole. In this case, the passivation layer may fill the etching hole.

In the touch sensor of the present invention, the contact holes and the dummy holes may form a same pattern.

In the touch sensor of the present invention, the contact holes and the dummy holes may have a same shape, a same area, and a same spacing.

In the touch sensor of the present invention, the bridge may be made of a conductive metal, and the electrode layer may be made of a transparent metal oxide.

The touch sensor of the present invention may further comprise a passivation layer formed on the insulation layer and the bridges and filling the etching hole.

A method of manufacturing a touch sensor of the present invention may comprise steps of: forming, on a base layer, an electrode layer having first array sensing cells connected and arranged in a first direction, second array sensing cells spaced apart from the first array sensing cells and arranged spaced apart in a second direction, and dummy holes in the first and second array sensing cells excluding bridge contact areas of the second array sensing cells; forming an insulation layer on the electrode layer; forming a contact hole in the bridge contact area in the insulation layer; forming a conductive metal layer for a bridge for electrically connecting the neighboring second array sensing cells on the contact hole and the insulation layer; forming the bridge having a width narrower than that of the contact hole by etching the conductive metal layer.

In the method of manufacturing a touch sensor of the present invention, the step of forming the bridge may include etching the second array sensing cells in an area excluding the bridge area in the contact hole.

The method of manufacturing a touch sensor of the present invention may further comprise a step of forming a passivation layer on the insulation layer, the bridge, and an etching hole of the second array sensing cells.

In the method of manufacturing a touch sensor of the present invention, the step of forming the dummy holes may include forming the dummy holes to have a uniform shape, a uniform area, and a uniform spacing.

In the method of manufacturing a touch sensor of the present invention, the step of forming the contact holes may include forming the contact holes to have a same shape, a same area, and a same spacing as the dummy holes.

Advantageous Effects

According to the touch sensor having such a configuration of the present invention and manufacturing method thereof, dummy holes with the same shape, area, and spacing as contact holes of an insulation layer may be formed in an electrode layer. Through this, the present invention can prevent or minimize a problem of visibility of the contact hole area caused by etching of the electrode layer during the bridge formation process.

According to the touch sensor and the manufacturing method of the present invention, there is no need to worry about the visibility problem caused by etching of the electrode layer during the bridge formation process. As a result, there is no obstacle in minimizing the width of the bridge within the tolerance range of the resistance. In addition, the bridge material can be selected to use a low-resistance metal. As a result, it is easy to implement a low-resistance touch sensor.

Further, according to the touch sensor and the manufacturing method of the present invention, there is no problem even if the electrode layer is etched during the bridge formation process. Therefore, there is no limitation in choosing the selective etching solution for the bridge. As a result, the bridge etching process can be performed easily and quickly through appropriate selection of the etching solution.

DESCRIPTION OF DRAWINGS

FIG. 1 is a combined perspective view of a touch sensor according to the present invention.

FIG. 2 is an exploded perspective view of a touch sensor according to the present invention.

FIG. 3 is a plan view of a bridge area in a touch sensor according to the present invention.

FIG. 4A and FIG. 4B are cross-sectional views taken along AN and BB' of a bridge area in a touch sensor according to the present invention.

FIGS. 5A to 5E show a method of manufacturing a touch sensor according to the present invention.

BEST MODE

Hereinafter, the present invention will be described in detail with reference to the drawings.

FIG. 1 and FIG. 2 are a combined perspective view and an exploded perspective view of a touch sensor according to the present invention, respectively.

As shown in FIG. 1 and FIG. 2, the touch sensor according to the present invention may comprise a base layer 100, an electrode layer 200, an insulation layer 300, a bridge 500, a passivation layer 400, and so on.

The base layer 100 is a base supporting the electrode layer 200 and the like combined thereon. The base layer 100 may typically be a base film. The base layer 100 may be a separation layer or the like when manufacturing a touch sensor by a transfer method.

The base film is not limited if it has good transparency, mechanical strength and thermal stability. Specific examples of the base film may include thermoplastic resins, e.g., polyester resins such as polyethylene terephthalate, polyethylene isophthalate, polyethylene naphthalate and polybutylene terephthalate; cellulose resins such as diacetylcellulose and triacetylcellulose; polycarbonate resins; acrylate resins such as polymethyl (meth)acrylate and polyethyl (meth)acrylate; styrene resins such as polystyrene and acrylonitrile-styrene copolymer; polyolefin resins such as polyethylene, polypropylene, polyolefin having a cyclic or norbornene structure, and ethylene-propylene copolymer; vinyl chloride resins; amide resins such as nylon and aromatic polyamide; imide resins; polyethersulfone resins; sulfone resins; polyether ether ketone resins; polyphenylene sulfide resins; vinyl alcohol resins; vinylidene chloride resins; vinyl butyral resins; allylate resins; polyoxymethylene resins; and epoxy resins. Also, a film consisting of a blend of the thermoplastic resins may be used as the base film. In addition, thermally curable or UV curable resins such as (meth)acrylate, urethane, acrylic urethane, epoxy and silicon resins may be used as the base film.

As the separation layer, an organic polymer film may be used. For example, at least one selected from the group consisting of polyimide, poly vinyl alcohol, polyamic acid, polyamide, polyethylene, polystyrene, polynorbornene phenylmaleimide copolymer, polyazobenzene, polyphenylenephthalamide, polyester, polymethyl methacrylate, polyarylate, cinnamate polymer, coumarin polymer, phthalimidine polymer, chalcone polymer and aromatic acetylene polymer may be used as the separation layer.

The electrode layer 200 is to sense a touch signal and may be formed on the base layer 100. The electrode layer 200 may include first array sensing cells 210 connected and arranged in a first direction and second array sensing cells 220 spaced apart from the first array sensing cells 210 and arranged spaced apart in a second direction.

The first array sensing cells 210 and the second array sensing cells 220 may be spaced apart in the form of an island. The second array sensing cells 220 arranged spaced apart from each other may be electrically connected through the bridge 500 which will be described later.

The first and the second array sensing cells 210 and 220 may be provided with dummy holes H1. The dummy holes H1 may be formed to have a regular pattern, i.e., a uniform shape, a uniform area, and a uniform spacing. The dummy holes H1 may be configured in various shapes such as polygons such as triangles, squares, and pentagons, or curved shapes such as circles and ellipses. The dummy holes H1 may be formed to have the same pattern, i.e., the same shape, area, and spacing as contact holes H2 of the insulation layer 300 which will be described later. Through this, it is possible to prevent or minimize the visibility of the contact hole H2 area while the electrode layer 200 is etched in the process of forming the bridge 500.

The electrode layer 200 may have a structure in which a transparent metal oxide, a thin film metal, and a transparent metal oxide are sequentially stacked. In this case, the transparent metal oxide may have a thickness of 10 to 60 nm, and the thin film metal may have a thickness of 5 to 20 nm. The electrode layer 200 may have a structure in which a thin film metal and a transparent metal oxide are sequentially stacked. In this case, the thin film metal may have a thickness of 50 to 300 nm, and the transparent metal oxide may have a thickness of 5 to 50 nm. Or, the electrode layer 200 may be formed only of a thin film metal. In this case, the thin film metal may have a thickness of 50 to 300 nm.

In the electrode layer 200, gold (Au), silver (Ag), copper (Cu), molybdenum (Mo), aluminum (Al), palladium (Pd), neodymium (Nd), silver-palladium-copper alloy (APC) or the like may be used as the metal. In the electrode layer 200, a metal oxide may be used. The metal oxide may be indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), aluminum zinc oxide-silver-aluminum zinc oxide (AZO-Ag-AZO), etc.

The insulation layer 300 may be formed on the electrode layer 200 while filling the dummy holes H1 and the space between the first and second array sensing cells 210 and 220.

The insulation layer 300 may have a plurality of contact holes H2 for connecting the neighboring second array sensing cells 220 in the second direction. One contact hole H2 may be formed at each end of the second array sensing cells 220 in the second direction. The contact hole H2 is usually configured in a square shape, but the shape is not limited thereto, and shapes such as pentagonal, circular, etc. are possible. The shape, area, and spacing of the contact holes H2 may be a criterion for determining the shape, area, and spacing of the dummy holes H1 formed in the electrode layer 200.

The insulation layer 300 may be formed of a curable prepolymer, a curable polymer, or a plastic polymer.

The bridge 500 electrically connects the neighboring second array sensing cells 220 in the second direction, and may be formed inside the contact hole H2 and on a portion of an upper surface of the insulation layer 300.

The length of the bridge 500 may be at least equal to the distance between the contact holes H2. The width of the bridge 500 may be smaller than the width of the contact hole H2. Through this, it is desirable to prevent or minimize the visibility of the bridge 500 area.

The bridge 500 may be made of a conductive metal oxide, but it is preferable to be made of a conductive metal in order to implement a narrow width and a low resistance. As the conductive metal, silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy thereof (e.g., silver-palladium-copper (APC)) can be used. These may be used alone or in combination of two or more. The bridge 500 may further have a capping layer on the conductive metal. The capping layer may be made of a transparent conductive oxide such as indium tin oxide (ITO), indium zinc oxide (IZO), zinc oxide (ZnO), indium zinc tin oxide (IZTO), and cadmium tin oxide (CTO).

The passivation layer 400 may be formed on the insulation layer 300 and the bridges 500. The bridge 500 may have a width narrower than that of the contact hole H2. Through this, the passivation layer 400 may fill the etched area of the second array sensing cells 220 when portions of the second array sensing cells 220 are removed by etching. The passivation layer 400 may be made of an organic film or the like.

FIG. 3 is a plan view of a bridge area in a touch sensor according to the present invention. FIG. 4A and FIG. 4B are cross-sectional views taken along AN and BB' of the bridge area in the touch sensor according to the present invention.

As shown in FIG. 3, the bridge 500 may electrically connect neighboring second array sensing cells 220. At this time, the bridge 500 may be formed as a so-called thin line bridge having a width narrower than that of the contact hole H2.

As shown in FIG. 4A, in the stacked structure of the touch sensor, the insulation layer 300 is formed on an upper surface of the electrode layer 200. The bridge 500 may penetrate the insulation layer 300 to connect the second array sensing cells 220. The passivation layer 400 may be formed on the insulation layer 300 and the upper surfaces of the bridge 500 to protect the bridge 500. As shown in FIG. 4A, dummy holes H1, which are spaced apart at the same distance as the distance between contact holes H2, are formed in the second array sensing cells 220 in the direction in which the contact holes H2 are arranged, that is, in the second direction.

As shown in FIG. 4B, in the second array sensing cell 220, areas excluding the bridge 500 area are removed from the contact hole H2 area to form an etching hole H3. The passivation layer 400 protecting the bridge 500 may fill the etching hole H3 and the contact hole H2. In FIG. 4B, dummy holes H1, which are spaced apart at the same distance as the distance between the contact holes H2, are formed in the first array sensing cells 210 in a direction perpendicular to the arrangement direction of the contact holes H2, that is, in the first direction.

FIGS. 5A to 5E show a method of manufacturing a touch sensor according to the present invention.

In the method of manufacturing a touch sensor according to the present invention, as shown in FIG. 5A, first, a transparent conductive layer such as a metal oxide is formed on a base layer 100, and then an electrode layer 200 may be formed through a method such as photolithography. The electrode layer 200 may be formed by coating, imprinting, or the like. The electrode layer 200 includes first array sensing cells 210 connected and arranged in a first direction, and second array sensing cells 220 arranged spaced apart in a second direction while being spaced apart from the first array sensing cells 210.

As shown in FIG. 5A, the electrode layer 200 may include dummy holes H1 in the first and second array sensing cells 210 and 220 excluding the contact area of a bridge 500 of the second array sensing cell 220. The dummy holes H1 may be formed and arranged in the same form as the shape, area, and spacing of contact holes H2 which will be formed in an insulation layer 300 in a subsequent process.

As shown in FIG. 5B, the insulation layer 300 may be formed on the electrode layer 200. The insulation layer 300 may fill the dummy hole H1 and the space between the first and second array sensing cells 210 and 220 and be formed thereon.

As shown in FIG. 5C, the contact holes H2 may be formed in the insulation layer 300. The contact holes H2 may open contact areas of the neighboring second array sensing cells 220. The contact holes H2 may be formed in a rectangular shape as in FIG. 5C, or in other shapes such as a circle. Here, the shape, area, and spacing of the contact holes H2 may become a criterion for the pattern of the dummy holes H1 in the electrode layer 200. Accordingly, the contact holes H2 in this step need to be formed to have the same pattern (shape, area, spacing, etc.) as the pattern of the dummy holes H1 formed in FIG. 5A.

As shown in FIG. 5D, a conductive metal layer 510 for forming the bridge 500 may be formed inside the contact hole H2 and on the insulation layer 300 of the contact hole H2 area. The conductive metal layer 510 may be formed only of a conductive metal with a low resistance such as gold (Au), silver (Ag), copper (Cu), molybdenum (Mo), aluminum (Al), palladium (Pd), neodymium (Nd), silver-palladium-copper alloy (APC), or a capping layer made of a transparent conductive oxide such as indium tin oxide (ITO), indium zinc oxide (IZO), zinc oxide (ZnO), indium zinc tin oxide (IZTO), cadmium tin oxide (CTO) may be further formed on top of the conductive metal.

As shown in FIG. 5E, the bridge 500 with a width narrower than that of the contact hole H2 may be formed by etching the conductive metal layer 510. At this time, the second array sensing cell 220 in the contact hole H2 excluding the bridge 500 area may be etched together and removed in the etching process of the conductive metal layer 510. As a result, an etching hole H3 may be formed in the second array sensing cell 220.

Thereafter, a passivation layer 400 may be formed on the insulation layer 300 and the bridge 500. At this time, the passivation layer 400 may fill the contact holes H2 of the insulation layer 300 and the etching hole H3 of the second array sensing cell 220. The passivation layer 400 may be formed by evaporation, sputtering, or the like.

In the above, the present invention has been described with embodiments, which are intended to illustrate the present invention. Those skilled in the art will be able to change or modify these embodiments in other forms. However, since the scope of the present invention is defined by the claims below, such changes or modifications can be interpreted as being included in the scope of the present invention.

DESCRIPTION OF REFERENCE NUMERALS

100: base layer
200: electrode layer
210: first array sensing cell
220: second array sensing cell
300: insulation layer
400: passivation layer
500: bridge
510: conductive metal layer
H1: dummy hole
H2: contact hole
H3: etching hole

The invention claimed is:

1. A touch sensor comprising:
a base layer;
an electrode layer including, on the base layer, first array sensing cells connected and arranged in a first direction and second array sensing cells spaced apart from the first array sensing cells and arranged spaced apart in a second direction, the first and second sensing cells being provided with dummy holes;
an insulation layer formed on the electrode layer and being provided with contact holes connecting the neighboring second array sensing cells in the second direction; and
bridges formed on the contact holes and the insulation layer to electrically connect the neighboring second array sensing cells.

2. The touch sensor according to claim 1, wherein the bridge has a width narrower than that of the contact holes.

3. The touch sensor according to claim 2, wherein the second array sensing cell is provided with an etching hole formed by removing an area excluding the bridge area in the contact holes.

4. The touch sensor according to claim 3, wherein the contact holes and the dummy holes form a same pattern.

5. The touch sensor according to claim 4, wherein the contact holes and the dummy holes have a same shape, a same area, and a same spacing.

6. The touch sensor according to claim 3, further comprising a passivation layer formed on the insulation layer and the bridges and filling the etching hole.

7. The touch sensor according to claim 1, wherein:
the bridge is made of a conductive metal; and
the electrode layer is made of a transparent metal oxide.

8. A method of manufacturing a touch sensor comprising steps of:
forming, on a base layer, an electrode layer having first array sensing cells connected and arranged in a first direction, second array sensing cells spaced apart from the first array sensing cells and arranged spaced apart in a second direction, and dummy holes in the first and second array sensing cells excluding bridge contact areas of the second array sensing cells;
forming an insulation layer on the electrode layer;
forming a contact hole in a bridge contact area in the insulation layer;
forming a conductive metal layer for a bridge for electrically connecting the neighboring second array sensing cells on the contact hole and the insulation layer;
forming the bridge having a width narrower than that of the contact hole by etching the conductive metal layer.

9. The method of manufacturing a touch sensor according to claim 8, wherein the step of forming the bridge includes etching the second array sensing cells in an area excluding the bridge area in the contact hole.

10. The method of manufacturing a touch sensor according to claim 9, further comprising a step of forming a passivation layer on the insulation layer, the bridge, and an etching hole of the second array sensing cells.

11. The method of manufacturing a touch sensor according to claim 8, wherein the step of forming the dummy holes includes forming the dummy holes to have a uniform shape, a uniform area, and a uniform spacing.

12. The method of manufacturing a touch sensor according to claim 11, wherein the step of forming the contact holes includes forming the contact holes to have a same shape, a same area, and a same spacing as the dummy holes.

13. The touch sensor according to claim 2, wherein:
the bridge is made of a conductive metal; and
the electrode layer is made of a transparent metal oxide.

14. The touch sensor according to claim 3, wherein:
the bridge is made of a conductive metal; and
the electrode layer is made of a transparent metal oxide.

15. The touch sensor according to claim 4, wherein:
the bridge is made of a conductive metal; and
the electrode layer is made of a transparent metal oxide.

16. The touch sensor according to claim 5, wherein:
the bridge is made of a conductive metal; and
the electrode layer is made of a transparent metal oxide.

17. The touch sensor according to claim 6, wherein:
the bridge is made of a conductive metal; and
the electrode layer is made of a transparent metal oxide.

* * * * *